United States Patent [19]
Fosler et al.

[11] Patent Number: 5,963,971
[45] Date of Patent: Oct. 5, 1999

[54] METHOD AND APPARATUS FOR HANDLING AUDIT REQUESTS OF LOGICAL VOLUMES IN A VIRTUAL MEDIA SERVER

[75] Inventors: Christine Lynette Fosler; Frank David Gallo; Raymond Anthony James; Anthony Andrew Lambert, all of Tucson, Ariz.

[73] Assignee: International Business Machines Corporation, Armonk, N.Y.

[21] Appl. No.: 08/948,366

[22] Filed: Oct. 9, 1997

[51] Int. Cl.[6] .................................................. G06F 12/10
[52] U.S. Cl. ............................................. 711/114; 711/111
[58] Field of Search ............................... 711/4, 100, 111, 711/112, 113, 114, 202, 203

[56] References Cited

U.S. PATENT DOCUMENTS

| | | | |
|---|---|---|---|
| 4,467,421 | 8/1984 | White ........................................ | 711/118 |
| 5,276,867 | 1/1994 | Kenley et al. ........................... | 707/204 |
| 5,303,214 | 4/1994 | Kulakowski et al. .................... | 369/34 |
| 5,325,523 | 6/1994 | Beglin et al. ............................ | 707/200 |
| 5,327,535 | 7/1994 | Ogata et al. ............................. | 711/113 |
| 5,408,630 | 4/1995 | Moss ....................................... | 711/112 |
| 5,438,674 | 8/1995 | Keele et al. .............................. | 711/4 |
| 5,455,926 | 10/1995 | Keele et al. .............................. | 711/4 |
| 5,469,560 | 11/1995 | Beglin ...................................... | 711/112 |
| 5,870,732 | 2/1999 | Fisher et al. ............................. | 711/100 |

FOREIGN PATENT DOCUMENTS 5-73221  3/1993  Japan ................................ G06F 3/06

OTHER PUBLICATIONS

Abstract of Japanese Patent No. 05–73221 for "Magnetic Tape Controller", Nishimura et al.
U.S. application No. 08/707,891, "Virtual Integrated Cartridge Loader for Virtual Tape Storage System", filed Sep. 10, 1996, in the names of Carlson et al.

*Primary Examiner*—Eddie P. Chan
*Assistant Examiner*—Kevin L. Ellis
*Attorney, Agent, or Firm*—Gray Cary Ware; Friedenrich

[57] ABSTRACT

In a data storage subsystem a virtual removable media server (VRMS) handles host audit requests, whether directed to a physical volume or a virtual volume physically stored in cache or in a removable physical media item. The subsystem includes a storage interface between the host and data storage facilities including a cache and a physical media library. To the host, the storage interface emulates a virtual library including a plurality of virtual media items, each containing a logical volume of data. The library may also maintain physical media items each storing one logical volume, as in a traditional library. To verify presence of a specified logical volume of the virtual library, the host sends an audit request. Responsively, the subsystem cross-references the specified logical volume in a first list to identify physical locations of underlying data. This physical location may be an address in the cache and/or a physical volume corresponding to a physical media item in the library. If the underlying data is stored exclusively in cache, the subsystem automatically answers affirmatively to the audit request. If the underlying data is stored in the physical media, the subsystem searches the library for the physical media item containing the physical volume that includes the specified logical volume, and answers the audit request affirmatively if the physical media item is found. If the physical media item is not found, the subsystem answers the audit request negatively.

48 Claims, 5 Drawing Sheets

METHOD AND APPARATUS FOR HANDLING AUDIT REQUESTS OF LOGICAL VOLUMES IN A VIRTUAL MEDIA SERVER

BACKGROUND OF THE INVENTION

1. Field of the Invention

The present invention relates to digital data storage systems. More particularly, the invention concerns a data storage subsystem comprising a virtual removable media server (VRMS) that handles audit requests, whether directed to a physical volume or a virtual volume physically stored in cache or in a removable physical media item.

2. Description of the Related Art

Data storage libraries are one of the most popular types of mass storage system today. Generally, a data storage library connotes a great number of co-located portable data storage media, transported by a robotic mechanism between locations such as storage cells, read/write media drives, and input/output facilities.

These libraries have become popular for many reasons. First, the portable data storage media, usually magnetic tape or optical media, are typically inexpensive relative to other storage formats such as magnetic disk drives. Furthermore, libraries are easily expanded to accommodate more data, simply by adding more items of media and storage cells. Additionally, most libraries can be easily updated with new equipment as it comes onto the market. For example, a new model tape drive may be introduced to the library to supplement or replace the existing drives.

A typical library includes an expandable protective structure, constructed of various doors and panels, to house the library's drives, storage cells, robotic device, and related electronic equipment. The robotic device, called an "accessor" includes appropriate mechanical and electrical subcomponents to move side-to-side, lengthwise, and up-down within the protective structure. The accessor is usually managed by a component such as an automated library manager.

One new application of the data storage library is the virtual removable media server (VRMS). In a VRMS, data is stored in removable media items managed in a library, and also in a shared direct access storage cache. In particular, the cache stores newly received data from its host(s), and also reads stored data in response to requests from the host(s). The cache emulates removable media items by representing data in "virtual" removable media items, while providing many advantages not available with many removable media, such as high speed storage, data appendibility, and the like. All host requests are satisfied with reference to a media volume, whether they are ultimately satisfied from a physical media item in the library or from a "virtual" media item in the cache.

Additional information about tape emulation systems, many of which are well known in the art, is provided by the following references: (1) U.S. Pat. No. 4,467,421, entitled "Virtual Storage System & Methods", issued Aug. 21, 1984, and (2) U.S. patent application Ser. No. 08/707,891, entitled "Virtual Integrated Cartridge Loader for Virtual Tape Storage System", filed on Sep. 10, 1996 in the names of Carlson et al. The contents of the foregoing references are incorporated by reference into this application.

One source of VRMSs in today's marketplace is International Business Machines Corp., which manufactures the IBM 3494, using magnetic tape as its removable media. Although VRMSs such as these represent significant advances in the field of data storage libraries, International Business Machines Corp. has continually sought to improve the performance and efficiency of these systems. One area of particular focus is achieving compatibility and seamlessness between "virtual" and physical data storage systems.

Particularly, it is desirable for the VRMS to service host requests exactly as a data storage library would, without host awareness of any "virtual" media items. Thus, the VRMS should permit the host to interface with the VRMS as if the host were storing and retrieving data from a library of removable media items. Some host operations, however, inherently require reference to specific media items or volumes, and therefore have little or no applicability in VRMSs. Consequently, known VRMSs are not completely adequate for some applications due to certain unsolved problems.

SUMMARY OF THE INVENTION

A data storage subsystem includes a virtual removable media server (VRMS) that handles audit requests from a host, whether the audit requests are directed to a physical volume or a virtual volume physically stored in cache or in a removable physical media item. The data storage subsystem includes a storage interface between the host and various data storage facilities including a direct-access storage device (DASD) cache and a physical media library. In communicating with the host, the storage interface emulates a virtual library including a plurality of virtual media items, each containing a logical volume of data. These logical volumes are actually stored in the cache and the library's physical media items. In the library each physical media items may contain multiple logical volumes stacked together, or alternatively, a single logical volume as in a traditional library.

First, an audit request is received from the host, requesting to verify presence of a specified logical volume of the virtual library. In response, the subsystem cross-references the specified logical volume in a first list to identify physical locations of underlying data represented by the logical volume. These physical locations include (1) an address in the DASD cache, if data underlying the logical volume is stored in the DASD cache, and (2) a physical volume corresponding to a physical media item in the physical library, if the data underlying the logical volume is stored in the physical library.

If the underlying data is stored exclusively in DASD cache, the subsystem provides an "affirmative" output to the audit request. If the underlying data is stored in the physical library, the subsystem searches the physical library for the physical media item containing the physical volume that includes the specified logical volume, and provides an affirmative output to the audit request if the physical media item is found. If the physical media items is not found, the subsystem provides a negative output to the audit request.

Accordingly, one embodiment of the invention may be implemented to provide a method to handle audit requests of logical volumes in a VRMS. In another embodiment, the invention may be implemented to provide an apparatus such as a data storage subsystem featuring a VRMS that handles audit requests of logical volumes. In still another embodiment, the invention may be implemented to provide a signal-bearing medium tangibly embodying a program of machine-readable instructions executable by a digital data processing apparatus to perform method steps for handling audit requests of logical volumes in a VRMS.

The invention affords its users with a number of distinct advantages. Chiefly, the invention provides a VRMS that recognizes and responds to audit requests, whether the request is directed to a logical volume stored in cache or on a physical media item. As a result, the VRMS is advantageously able to service host requests exactly as a data storage library would, without any host awareness of any "virtual" media items. Thus, the VRMS permits the host to interface with the VRMS as if the host were storing and retrieving data exclusively in a library of removable media items. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Figure 1:
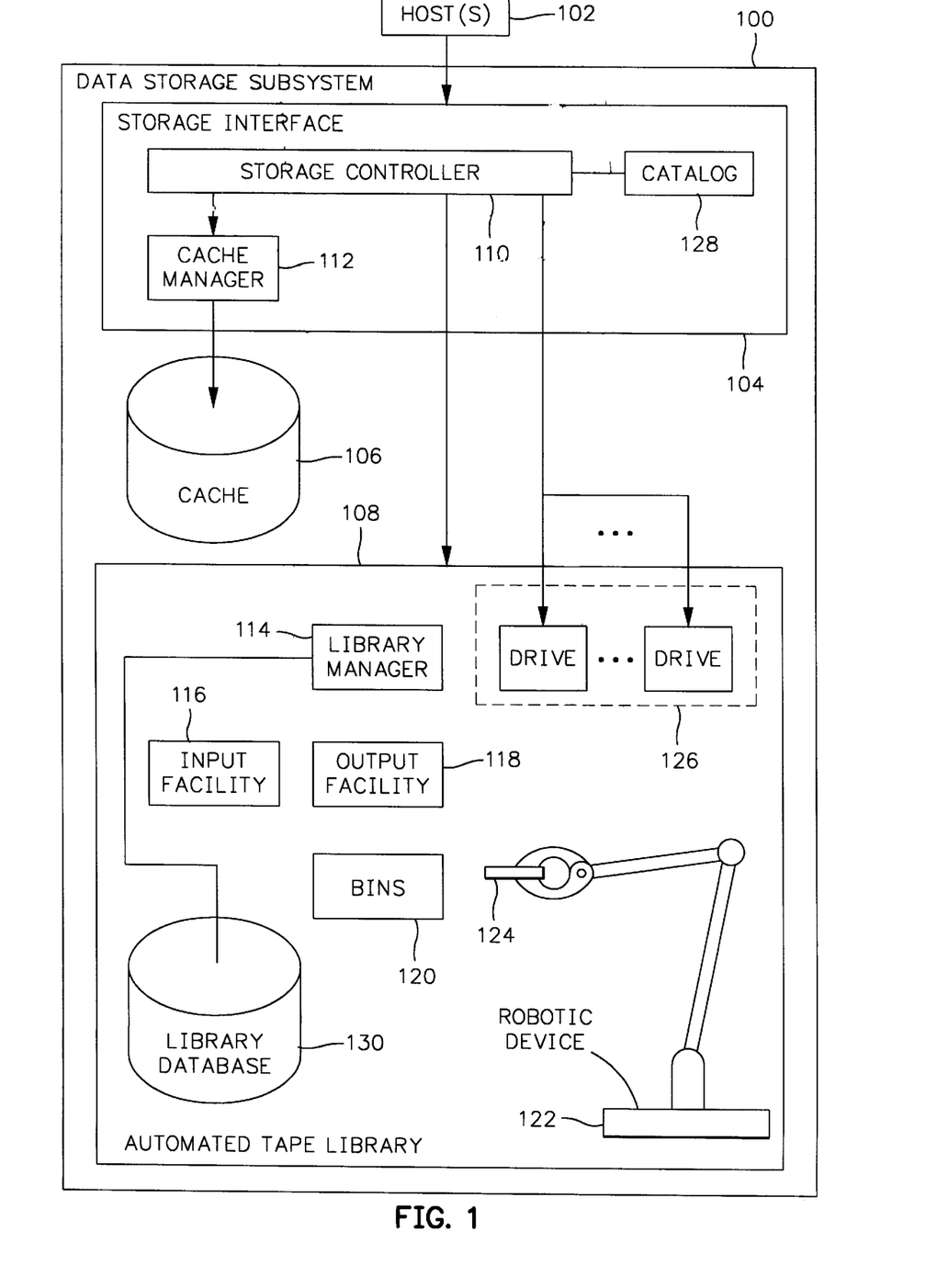
FIG. 1 is a block diagram of the hardware components and interconnections of a VRMS in accordance with the invention.

One aspect of the invention concerns a data storage subsystem providing a virtual removable media storage function, which also handles audit requests of logical volumes. FIG. 1 depicts the various hardware components and interconnections of one example of this subsystem.

Subsystem Components

Generally

FIG. 1 depicts one or more hosts 102 and a data storage subsystem 100, where a storage interface 104 interconnects the host(s) 102 with a cache 106 and also with a physical media library 108. The host(s) 102 issues commands in an appropriate format to direct the performance of read and/or write operations to removable data storage media in a data storage library.

However, this library and the perceived media items do not actually exist. Instead, as discussed below, the storage interface 104 emulates the perceived data storage library in its communications with the host 102; data is actually stored by the cache 106 and/or the physical media library 108. Accordingly, the host's perceived data storage library may be called a "virtual library". Similarly, the media items known to the host, some or all of which do not actually exist in any physical embodiment, are called "virtual media." In an embodiment where each virtual media item contains a "volume" of data, each virtual media item may also be called a "logical volume."

Preferably, logical volumes that are stored in the physical library 108 are consolidated or "stacked" together, storing multiple logical volumes on one physical media item. If desired, the library 108 may also maintain a number of physical media items each storing one logical volume, as in a traditional library.

The subsystem 100 may incorporate hardware components of existing virtual removable media libraries, a number of which are well known in the art. One example is disclosed in U.S. Pat. No. 4,467,421, entitled "Virtual Storage System & Methods", issued Aug. 21, 1984. The '421 patent is incorporated by reference in its entirety.

Host(s)

The host(s) 102 may be embodied by a number of diverse systems, such as a library controller, mainframe computer, personal computer, and the like. Although one or multiple hosts may be used, the following description references a single host 102, for ease and simplicity of illustration. The host 102, in an exemplary embodiment, may comprise an IBM AS/400 server, RS-6000 machine, or another processing machine running IBM's MVS operating system. As an example, the host 102 may utilize the command protocol of an IBM 3494 data storage library in exchanging data with logical volumes maintained by the subsystem 100.

Storage Interface

The storage interface 104 includes a cache manager 112, a storage controller 110, and a catalog 128. The cache manager 112 oversees operations of the cache 106, and may comprise a new design or a conventional manager for the type of data storage device embodied by the cache 106. In the illustrated example, the cache manager 112 may comprise a disk drive controller, where the cache 106 comprises a magnetic "hard" disk drive.

The storage controller 110 serves to direct operations of the cache manager 112 and a library manager 114, and also to move data to/from drives 126 in the library 108. The storage controller I 10 receives commands and data from the host(s) 102, and issues appropriate commands to direct the cache and library managers 112/114 to take the necessary actions to execute host commands. The storage controller 110 preferably comprises an RS-6000 computing machine, or another suitable digital processing apparatus such as a microprocessor, personal computer, or more advanced processing machine.

As explained in greater detail below, the catalog 128 is used by the storage controller 110 to maintain information about the location of the data stored within the data storage subsystem 100.

Further detail of the structure and operation of the interface 104 to emulate a media data storage library in communicating with the host 102, while actually storing data on the cache 106 and media items 124, should be apparent to those of ordinary skill in the art having the benefit of this disclosure and known virtual libraries such as U.S. Pat. No. 4,467,421 referenced above.

Cache

Although the cache 106 may comprise a DASD such as a magnetic hard disk drive as mentioned above, the cache 106 may be implemented in a number of different forms, depending upon the particular requirements of the application. For example, the cache 106 may comprise one or more magnetic data storage disk drives, random access memory modules, optical data storage devices, or another suitable data storage device. Advantageously, the cache 106 may be a contiguous, non-library data storage unit, unlike the emulated multiplicity of virtual media. Preferably, the cache 106 comprises a contiguous direct access storage device providing fast read/write access. Regardless of the particular makeup of the cache 106, the cache manager 112 comprises an appropriate counterpart.

In one example of the subsystem 100, the cache 106 provides a fast-access data storage location. As discussed in greater detail below, newly received data may be first stored in the cache 106, and then immediately migrated to the library 108 or migrated to the library 108 upon satisfaction of some criteria, such as a period or level of non-use.

Physical Media Library

In contrast to the virtual library perceived by the host 102, the subsystem 100 also includes a "physical" media library 108, where the term "physical" is used to contrast with the "virtual" library.

The physical media library 108 comprises an apparatus that manages the storage, loading, unloading, movement, writing, and reading of media items, such as the media item 124. The media items comprise "removable" or "portable" data storage media such as magnetic tape, optical tape, optical disk, removable magnetic disk drive, CD-ROM, WORM, writable CD, digital video disk (DVD), removable DASD, or another appropriate format. If desired, some of these types of storage media may be self-contained within a portable container, or "cartridge". For universal reference to any of these types of storage media, this disclosure refers to "items" or "units" of media.

These media items 124 are preferably stored in bins 120, also called "cells" or "storage shelves". A robotic device 122 selectively directs media items 124 between locations including the bins 120, an input facility 116, an output facility 118, and a number of media drives 126. The input facility 116, for example, may include a batch loading mechanism (not shown) for receiving media items from an operator; one or more media storage slots may also be included in the input facility 116. Similarly, the output facility 118 may include a batch output mechanism (not shown) for transferring media items from the library 108 to an operator; one or more media storage slots may also be included in the output facility 118.

The library 108 also includes a library manager 114, which oversees operations of the library 108, and may comprise a new design or a conventional manager for the specific configuration embodied by the library 108. In the illustrated example, the library manager 114 may comprise the library manager used in the IBM model 3494 tape library.

Another component of the library 108 is the library database 130, which contains various data concerning the physical media items managed by the physical media library 108. Although the database 130 preferably comprises a magnetic disk drive that maintains its data using the IBM DB2 database software, ordinarily skilled artisans will recognize a variety of other database software packages and preferably nonvolatile storage devices suitable to implement the library database 130.

The library 108 may comprise a new design, or a conventional tape library. As an example, the library 108 may comprise an IBM model 3494 tape library with at least (1) an IBM 3490 model C2A tape drive to access the following types of tapes: the IBM CST tape (standard cartridge system tape, 18 or 36 track format), and the IBM ECCST tape (enhanced capacity cartridge system tape, 36 track format), and (2) an IBM 3590 model B2A tape drive to access the IBM HPCT tape (high performance cartridge tape, 128 track format). Preferably, the library 108 supports VRMS data storage jobs, where multiple virtual media items may be "stacked" together on one physical media item, as well as conventional, non-VRMS data storage tasks.

In one embodiment, the library 108 is independent from the exchange of data between the host 102 and the cache 106, operating under the interface 102 to occasionally migrate stale data from the cache 106, thereby freeing space on the cache 106 to contain more frequently or recently used data. "Stale" data may be identified, for example, by a least recently used ("LRU") analysis.

Exemplary Digital Data Processing Apparatus

In addition to the data storage subsystem exemplified above, another aspect of the invention concerns a digital data processing apparatus, which may be programmed or otherwise implemented to perform the functions of one or more processing components of the subsystem 100, such as the storage interface 110 and/or library manager 114.

Figure 2:
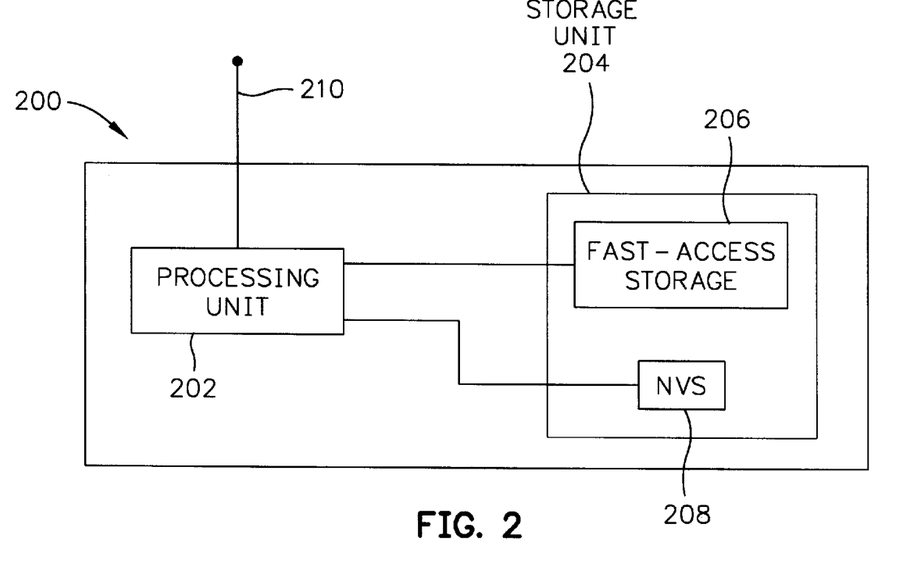
FIG. 2 is a block diagram of a digital data processing machine in accordance with the invention.

FIG. 2 shows an example of one digital data processing apparatus 200. The apparatus 200 includes a processing unit 202, such as a microprocessor or other processing machine, coupled to a storage unit 204. In the present example, the storage unit 204 includes a fast-access memory 206 and nonvolatile storage 208. The fast-access memory 206 preferably comprises random access memory, and may be used to store the programming instructions executed by the processing unit 202 during such execution. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processing unit 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

Data Files

Introduction

As mentioned above, the subsystem 100 includes a catalog 128 and a library database 130 to provide various information about the data in subsystem 100. The contents of the catalog 128 and database 130 are explained in greater detail below.

In the illustrated example, each logical volume of data is stored on a virtual media item, which is physically stored on one or more physical media items. The data on each physical media item constitutes one physical volume. Each logical volume and physical volume is exclusively associated with an identifying code, such as a volume serial number ("volser"). Thus, logical volumes are associated with logical volsers, and physical volumes are associated with physical volsers.

Catalog

As mentioned above, the catalog 128 is used by the storage controller 110 to maintain information about the location of the data stored within the data storage subsystem 100. The catalog 128 lists all logical volsers. Also, if the associated logical volume is stored in the physical library 108, the catalog 128 also lists the physical volser(s) of the physical media item(s) containing the logical volume. Analogously, the catalog 128 also contains a "yes" or "no" indicating whether a copy of the logical volume is stored in the cache 106.

As a specific example, the catalog 128 may take the form shown in Table 1, below.

TABLE 1

Catalog

| LOGICAL VOLSER | CORRESPONDING PHYSICAL VOLSER | PHYSICAL VOLSER CACHED? (Y/N) |
|---|---|---|
| XYZ | ABC | YES |
| UVW | DEF | NO |
| . | . | . |
| . | . | . |
| . | . | . |
| LMN | NONE | YES |

Database

As mentioned above, the library database 130 contains various data concerning the physical media items managed by the physical media library 108. Nominally, the library database 130 lists all volsers, whether logical or physical. Also, along with each volser, the library database 130 indicates whether the volser is logical and physical. If the volser corresponds to a physical media item, the library database 130 also lists whether the physical media item is presently mounted by a drive 126 or the robotic device 122 in the library 108, and where the physical media item has a home location in the bins 120.

As a more specific example, the library database 130 may take the form shown in Table 2, below.

TABLE 2

Library Database

| VOLSER | TYPE | MOUNTED? (Y/N) | LOCATION (RACK, COLUMN, ROW) |
|---|---|---|---|
| XYZ | LOGICAL | — | — |
| UVW | LOGICAL | — | — |
| LMN | LOGICAL | — | — |
| ABC | PHYSICAL | YES | (1, 2, 16) |
| DEF | PHYSICAL | NO | (9, 4, 4) |

Operation

In addition to the various hardware embodiments described above, a different aspect of the invention concerns a method for handling audit requests in a VRMS, whether such requests are directed to a physical volume or a virtual volume physically stored in cache or in a removable physical media item.

Signal-Bearing Media

In the context of FIG. 1, such a method may be implemented, for example, by operating one or more components of the subsystem 100, as embodied by one or more digital data processing apparatuses 200, to execute sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to handle audit requests of logical volumes in a VRMS.

Figure 3:
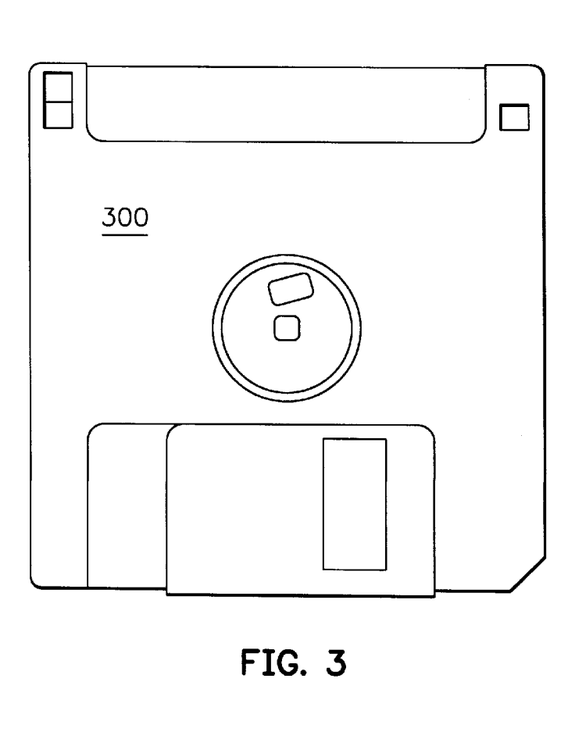
FIG. 3 shows an exemplary signal-bearing medium in accordance with the invention.

This signal-bearing media may comprise, for example, RAM (not shown) contained within the apparatus 200, as represented by the fast-access storage 206. Alternatively, the instructions may be contained in another signal-bearing media, such as a magnetic data storage diskette 300 (FIG. 300), directly or indirectly accessible by the processing unit 202. Whether contained in the apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled "C" language code.

Overall Sequence of Operation

Figure 4:
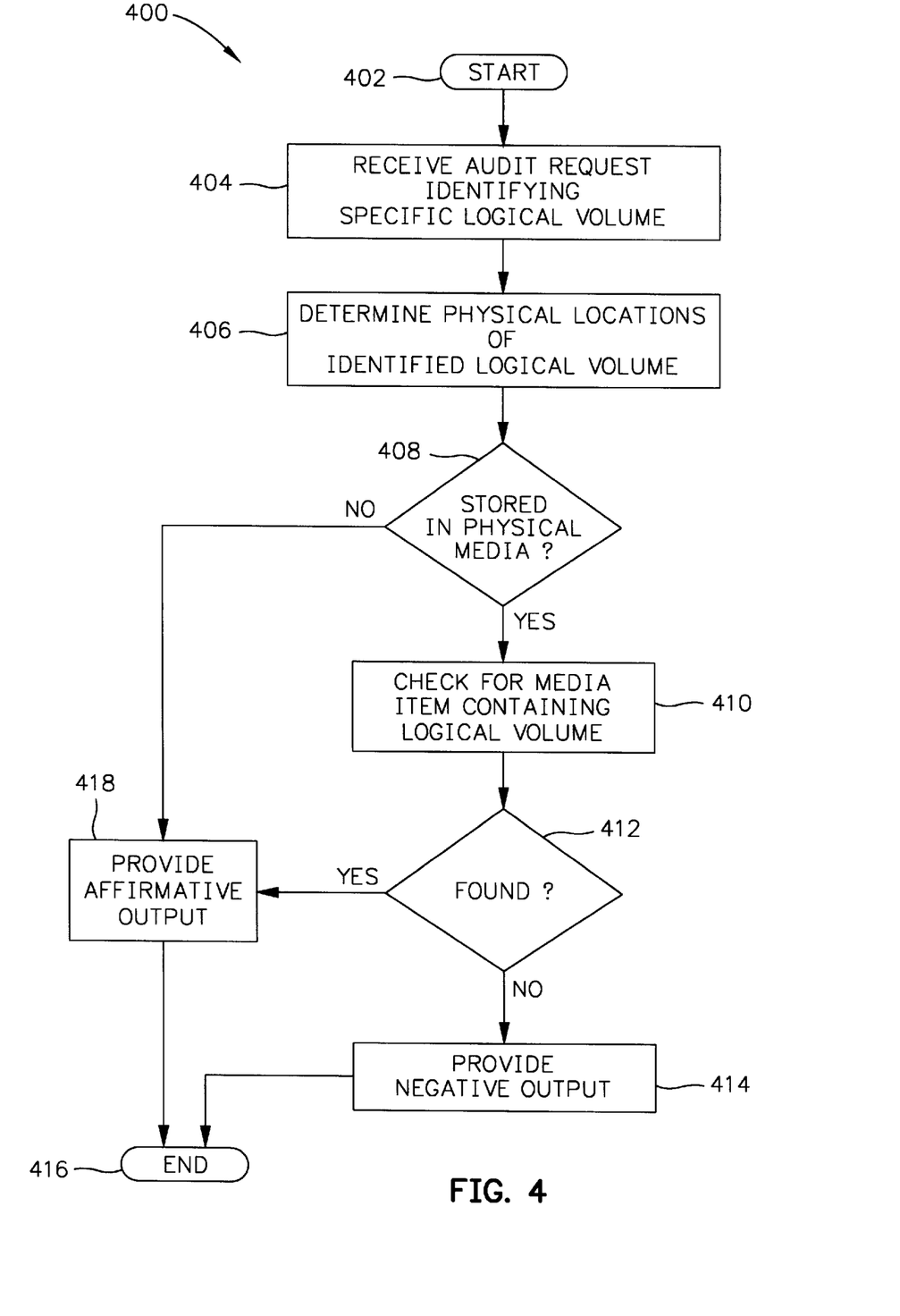
FIG. 4 is a flowchart of an operational sequence for handling audit requests of logical volumes in a VRMS, in accordance with the invention.

FIG. 4 shows a sequence of method steps 400 to illustrate one example of the method aspect of the present invention. For ease of explanation, but without any limitation intended thereby, the exemplary sequence of FIG. 4 is described in the context of the data storage subsystem 100 described above in FIG. 1.

After the routine 400 begins in step 402, the storage interface 104 receives an audit request from the host 102 in step 404. The audit request identifies a particular logical volume whose presence in the subsystem 100 is to be confirmed in response to the audit request. As an example, the identified logical volume may be contained in the cache 106 and/or stacked on a physical media item along with other virtual volumes, according to the VRMS aspect of the subsystem 100. The identified logical volume may also correspond to a single physical volume in the library 108, maintained by the library 108 as in a traditional library. In the illustrated example, the host 102 identifies the logical volume to be audited by a logical volser, uniquely identifying the logical volume.

In step 406, the physical location(s) of the identified volume is determined. In presently the illustrated example of FIG. 1 and Tables 1–2, step 406 is performed by the storage controller 110 cross-referencing the identified volume in the catalog 128 (Table 1) to determine (1) whether data underlying the volume is stored in the cache 106, and (2) the identity of a physical volume corresponding to a physical media item in the library 108, if the data underlying the identified volume is stored in the library 108.

Next, in step 408, the storage controller 110 asks whether the catalog 128 shows the identified volume to be stored in the library 108. If not, it is assumed that the volume is stored exclusively in the cache 106. Accordingly, as the audit operation is aimed chiefly at verifying presence of logical volumes stored on physical media items in the library 108, the storage controller 110 in step 418 provides an "affirmative" output to the audit request. This output effectively says "yes", the identified volume is present in the subsystem 100.

On the other hand, if step 408 finds that the identified volume is stored upon a physical media item, the library 108 searches for the media item in step 410. In the illustrated embodiment, this is performed by the library manager 114 first consulting the database 130 (Table 2) to determine whether the media item is presently mounted by the robotic device 122, and to identify a cell storage location for the media item. After consulting the database 130, the library manager 114 operates the robotic device 122 to actually search the identified locations for the physical media item sought.

If the media item is found, the step 418 returns an affirmative response to the host 102. Otherwise, step 414 provides a negative output. After steps 418 or 414, the routine 400 ends in step 416.

More Detailed Operational Example

Figure 5A:
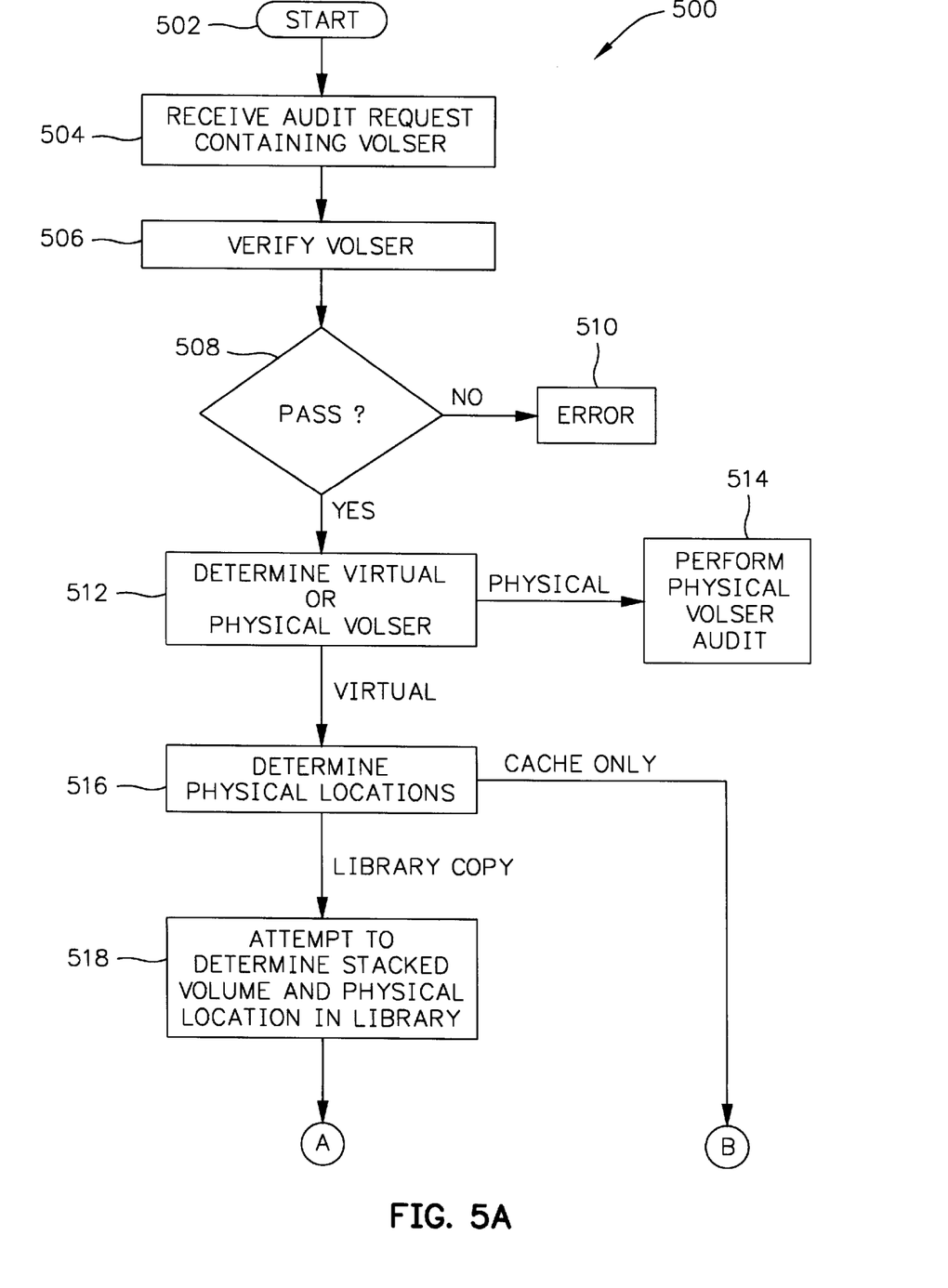
FIGS. 5A–5B show a flowchart of a more detailed operational sequence for handling audit requests of logical volumes in a VRMS, in accordance with the invention.
Figure 5B:
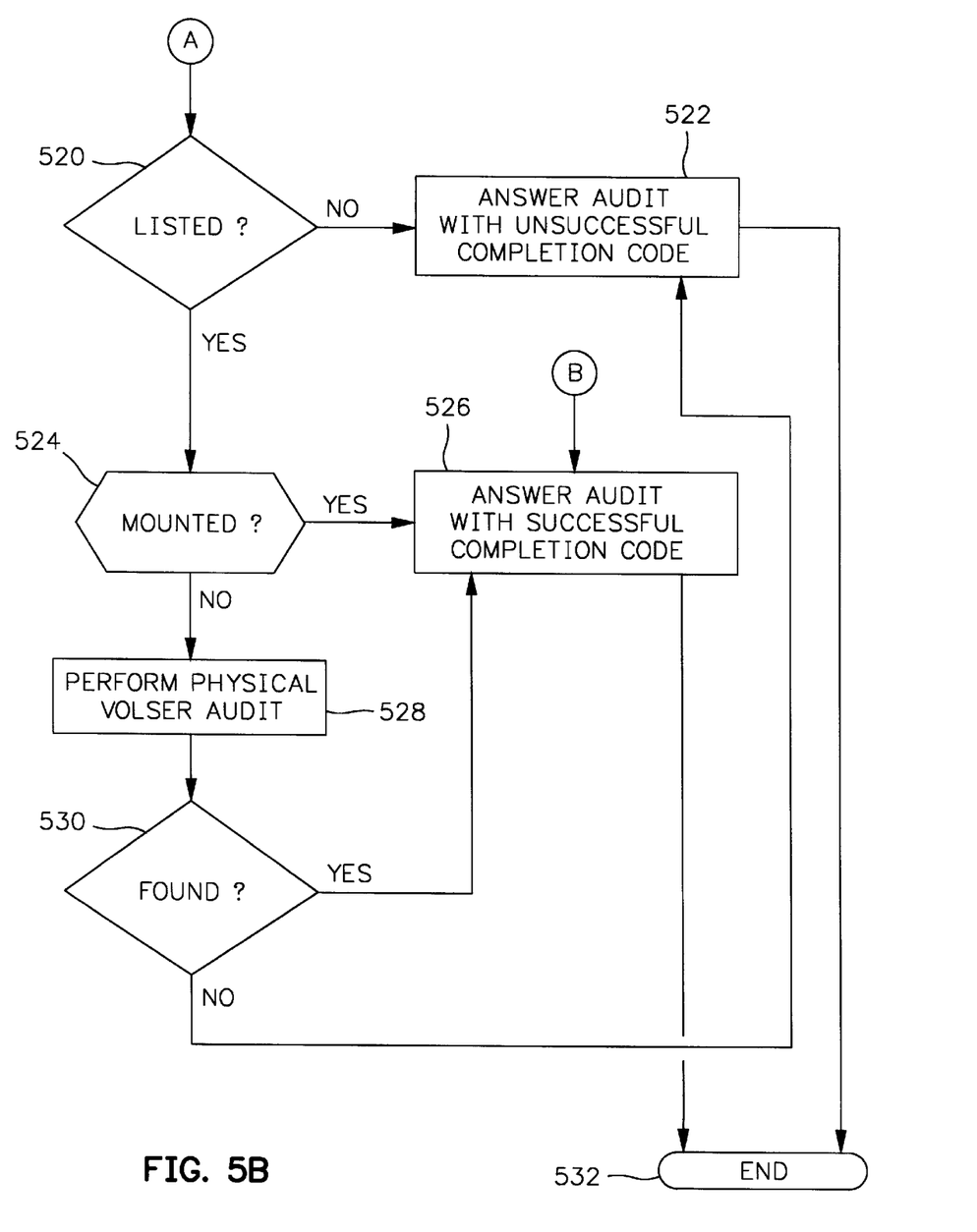

FIGS. 5A–5B show a sequence of method steps 500 to illustrate a more detailed example of the method aspect of the present invention. For ease of explanation, but without any limitation intended thereby, the exemplary sequence of FIGS. 5A–5B is described in the context of the data storage subsystem 100 described above in FIG. 1.

After the routine 500 begins in step 502, the storage interface 104 receives an audit request from the host 102 in step 504. The audit request identifies a particular volume whose presence in the subsystem 100 is to be confirmed in response to the audit request. In the illustrated example, the host 102 identifies the volume to be audited by a "volser", uniquely identifying the corresponding volume.

According to the VRMS aspect of the subsystem 100, the identified volume may be a logical volume, contained in the cache 106 or stored alone or stacked on a physical media item along with other virtual volumes as space permits. Instead, the identified volume may directly identify a physical volume of the library 108, apart from the VRMS aspect of the invention. Thus, the host 102 treats all audit requests alike, the means of physical storage of logical and physical volumes being completely transparent to the host 102.

In step 506, the storage interface 104 verifies the volser provided by the host 102. This may be performed, for example, by the storage controller 110 determining whether the identified volser appears in the catalog 128 (Table 1). If step 508 finds that the Volser cannot be verified, the storage interface 104 issues an appropriate error message to the host 102 in step 510.

If the volser passes step 508, the storage interface 104 in step 512 proceeds to determine whether the volser provided in step 504 is a "logical" volser or a "physical" volser. If physical, step 514 proceeds to determine a physical volser audit, which may be performed in accordance with conventional techniques known to those skilled in the art and used in commercially available physical libraries such as the IBM 3494.

If the volser is a virtual volser, however, step 516 proceeds to determine the physical location(s) of the identified volser. In presently the illustrated example of FIG. 1 and Tables 1–2, this is achieved by the storage controller 110 cross-referencing the identified volume in the catalog 128 (Table 1) to determine (1) whether data underlying the volume is stored in the cache 106, and (2) the identity of a physical volume corresponding to a physical media item in the library 108, if the data underlying the identified volume is stored in the library 108.

If the storage controller's consultation of the catalog 128 determines that the identified volser is stored exclusively in the cache 106, the sequence 500 proceeds to step 526, where the storage interface 104 provides a "successful completion" output to the host 102, answering the audit request. As mentioned above, the audit operation is aimed chiefly at verifying presence of media items in the library 108; thus, step 526 automatically answers "yes", the identified volume is present in the subsystem 100. After step 526, the routine 500 ends in step 532. As an alternative, if the catalog 128 reveals that the identified volser is stored exclusively in the cache 106, the storage controller 110 may consult another list (not shown) or the cache 106 itself to identify a cache address for the logical volume there, and then verify presence of the logical volume there, providing affirmative (step 526) or negative (step 522) answers depending upon whether the cache presence of the logical volume can be verified.

If the storage controller's consultation of the catalog 128 reveals storage of the identified volser in the library 108, whether or not it is cached, the routine 500 progresses from step 516 to step 518. In this case, the library 108 searches for the media item in step 518. In the illustrated embodiment, this is performed by the storage controller 110 consulting the catalog 128 to determine the physical volser corresponding to the identified logical volser. With this physical volser, also in step 518, the library manager 114 consults the database 130 in an attempt to determine the physical media item continuing this physical volser in the library 108.

If step 520 determines that the catalog 128 does not list a physical volser corresponding to the identified logical volser, the subsystem 100 in step 522 answers the audit request with an "unsuccessful completion", and the routine ends in step 532.

If step 520 finds that the physical volser is listed in the catalog 128, step 524 asks whether the search of the database 130 shows that the desired physical volume is presently mounted in a drive or by the robotic device 122. If so, step 526 provides a "successful completion" output to the host 102, answering the audit request, and the routine 500 ends in step 532.

If step 524 finds that the desired physical volume is not mounted, however, step 528 proceeds to perform a physical volser audit, which may be performed in accordance with conventional techniques known to those skilled in the art. Depending upon the success or failure of this operation, step 530 advances appropriately to step 526 (successful completion) or step 522 (unsuccessful completion). After steps 526 or 522, the routine 500 ends in step 532.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method of handling audit requests received by a data storage subsystem from a host, the data storage subsystem including a storage interface between the host and data storage facilities including a direct-access storage device (DASD) cache and a physical media library, where the storage interface in communicating with the host emulates a virtual library including a plurality of virtual media items each containing a logical volume of data, the method comprising the steps of:

receiving from the host an audit request comprising a request to verify presence of a specified logical volume of the virtual library;

identifying physical locations of the specified logical volume, the physical locations comprising at least one of the following:

the DASD cache, if the logical volume is stored in the DASD cache; and a physical volume corresponding to a physical media item in the physical media library, if the logical volume is stored in the physical media library; and if the identified physical locations include the DASD cache exclusively, providing an affirmative output to the audit request; and if the identified physical locations include the physical media library, searching the physical media library for the physical media item containing the physical volume that includes the specified logical volume, and providing an affirmative output to the audit request if the physical media item is found, otherwise, providing a negative output to the audit request.

2. The method of claim 1, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

3. The method of claim 1, the identifying of physical locations of the specified logical volume comprising cross-referencing the specified logical volume in a first list indicating, for each one of a plurality of logical volumes, all corresponding physical locations containing underlying data represented by the logical volume.

4. The method of claim 3, the first list including, for each logical volume:
   an indication of whether the logical volume is contained in the cache; and
   identification of a physical volume corresponding to a physical media item containing the logical volume, if the logical volume is stored in the physical media library.

5. The method of claim 1, the searching of the physical media library for the physical media item containing the physical volume that includes the specified logical volume comprising:
   cross-referencing the specified logical volume in a second list to identify one or more positions of the physical media item in the physical media library;
   searching the identified positions for the physical media item; and
   providing an affirmative output to the audit request if the physical media item is found, otherwise, providing a negative output to the audit request.

6. The method of claim 5, the one or more positions comprising at least one of the following:
   at least one physical media item storage cell;
   at least one media read/write drive; and
   a robotic media item transport device.

7. A method of handling audit requests received by a data storage subsystem from a host, the data storage subsystem including a storage interface between the host and data storage facilities including a direct-access storage device (DASD) cache and a physical media library, where the storage interface in communicating with the host emulates a virtual library including a plurality of virtual media items each containing a logical volume of data, the method comprising the steps of:
   receiving from the host an audit request comprising a request to verify presence of a specified volume of the virtual library;
   if the specified volume is a physical volume corresponding to a physical media item in the library, conducting a search of the physical media library for the physical media item and providing an affirmative output to the audit request if the physical media item is found, otherwise, providing a negative output to the audit request; and
   if the specified volume is a logical volume, performing steps comprising:
      identifying physical locations of the specified logical volume, the physical locations comprising at least one of the following:
         the DASD cache, if the logical volume is stored in the DASD cache; and
         a physical volume corresponding to a physical media item in the physical media library, if the logical volume is stored in the physical media library; and
      if the identified physical locations include the DASD cache exclusively, providing an affirmative output to the audit request; and
      if the identified physical locations include the physical media library, searching the physical media library for the physical media item containing the physical volume that includes the specified logical volume, and providing an affirmative output to the audit request if the physical media item is found, otherwise, providing a negative output to the audit request.

8. The method of claim 7, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

9. The method of claim 7, the conducting of a search of the physical library for the physical media item comprising:
   cross-referencing the physical volume in a fourth list to identify one or more positions of the physical media item in the library;
   searching the identified positions for the physical media item; and
   providing an affirmative output to the audit request if the physical media item is found, otherwise, providing a negative output to the audit request.

10. The method of claim 9, the one or more positions comprising at least one of the following:
    at least one physical media item storage cell;
    at least one media read/write drive; and
    a robotic media item transport device.

11. The method of claim 7, the identifying of physical locations of the specified logical volume comprising cross-referencing the specified logical volume in a first list indicating, for each one of a plurality of logical volumes, all corresponding physical locations containing underlying data represented by the logical volume.

12. The method of claim 11, the first list including, for each logical volume:
    an indication of whether the logical volume is contained in the cache; and
    identification of a physical volume corresponding to a physical media item containing the logical volume, if the logical volume is stored in the physical media library.

13. The method of claim 11, the searching of the physical media library for the physical media item containing the physical volume that includes the specified logical volume comprising:
    cross-referencing the specified logical volume in a second list to identify one or more positions of the physical media item in the physical media library;
    searching the identified positions for the physical media item; and
    providing an affirmative output to the audit request if the physical media item is found, otherwise, providing a negative output to the audit request.

14. The method of claim 13, the one or more positions comprising at least one of the following:
    at least one physical media item storage cell;
    at least one media read/write drive; and
    a robotic media item transport device.

15. A signal-bearing medium tangibly embodying a program of machine-readable instructions executable by a digital processing apparatus to perform a method for handling audit requests submitted by a host to a data storage subsystem, the data storage subsystem including a storage interface between the host and data storage facilities including a direct-access storage device (DASD) cache and a physical media library, where the storage interface in communicating with the host emulates a virtual library including a plurality of virtual media items each containing a logical volume of data, the method comprising the steps of:

receiving from the host an audit request comprising a request to verify presence of a specified logical volume of the virtual library;

identifying physical locations of the logical volume, the physical locations comprising:

the DASD cache, if the logical volume is stored in the DASD cache; and         a physical volume corresponding to a physical media item in the physical media library, if the logical volume is stored in the physical media library; and     if the identified physical locations include the DASD cache exclusively, providing an affirmative output to the audit request; and     if the identified physical locations include the physical media library, searching the physical media library for the physical media item containing the physical volume that includes the specified logical volume, and providing an affirmative output to the audit request if the physical media item is found, otherwise, providing a negative output to the audit request.

16. The medium of claim 15, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

17. The medium of claim 15, the searching of the physical media library for the physical media item containing the physical volume that includes the specified logical volume comprising:

cross-referencing the specified logical volume in a second list to identify one or more positions of the physical media item in the physical media library;

searching the identified positions for the physical media item; and     providing an affirmative output to the audit request if the physical media item is found, otherwise, providing a negative output to the audit request.

18. The medium of claim 17, the one or more positions comprising at least one of the following:

at least one physical media item storage cell;

at least one media read/write drive; and a robotic media item transport device.

19. The medium of claim 15 the identification of physical locations of the specified logical volume comprising cross-referencing the specified logical volume in a first list indicating, for each one of a plurality of logical volumes, all corresponding physical locations containing underlying data represented by the logical volume.

20. The medium of claim 19, the first list indicating, for each one of a plurality of logical volumes, all corresponding physical locations containing underlying data represented by the logical volume.

21. The medium of claim 19, the first list including, for each logical volume:

an indication of whether the logical volume is contained in the cache; and     identification of a physical volume corresponding to a physical media item containing the logical volume, if the logical volume is stored in the physical media library.

22. A signal-bearing medium tangibly embodying a program of machine-readable instructions executable by a digital processing apparatus to perform a method for handling audit requests submitted by a host to a data storage subsystem, the data storage subsystem including a storage interface between the host and data storage facilities including a direct-access storage device (DASD) cache and a physical media library, where the storage interface in communicating with the host emulates a virtual library including a plurality of virtual media items each containing a logical volume of data, the method comprising the steps of:

receiving from the host an audit request comprising a request to verify presence of a specified volume of the virtual library;

if the specified volume is a physical volume corresponding to a physical media item in the library, conducting a search of the physical media library for the physical media item and providing an affirmative output to the audit request if the physical media item is found, otherwise, providing a negative output to the audit request; and     if the specified volume is a logical volume, performing steps comprising:

identifying physical locations of the logical volume, the physical locations comprising at least one of the following:

the DASD cache, if the logical volume is stored in the DASD cache; and             a physical volume corresponding to a physical media item in the physical media library, if the logical volume is stored in the physical media library; and         if the identified physical locations include the DASD cache exclusively, providing an affirmative output to the audit request; and         if the identified physical locations include the physical media library, searching the physical media library for the physical media item containing the physical volume that includes the specified logical volume, and providing an affirmative output to the audit request if the physical media item is found, otherwise, providing a negative output to the audit request.

23. The medium of claim 22, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

24. The medium of claim 22, the identification of physical locations of the specified logical volume comprising cross-referencing the specified logical volume in a first list indicating, for each one of a plurality of logical volumes, all corresponding physical locations containing underlying data represented by the logical volume.

25. The medium of claim 24, the first list including, for each logical volume:

an indication of whether the logical volume is contained in the cache; and     identification of a physical volume corresponding to a physical media item containing the logical volume, if the logical volume is stored in the physical media library.

26. The medium of claim 22, the searching of the physical media library for the physical media item containing the physical volume that includes the specified logical volume comprising:

cross-referencing the specified logical volume in a second list to identify one or more positions of the physical media item in the library;

searching the identified positions for the physical media item; and providing an affirmative output to the audit request if the physical media item is found, otherwise, providing a negative output to the audit request.

27. The medium of claim 26, the one or more positions comprising at least one of the following:

at least one physical media item storage cell;

at least one media read/write drive; and a robotic media item transport device.

28. The medium of claim 22, the conducting of a search of the physical library for the physical media item comprising:

cross-referencing the physical volume in a fourth list to identify one or more positions of the physical media item in the library;

searching the identified positions for the physical media item; and providing an affirmative output to the audit request if the physical media item is found, otherwise, providing a negative output to the audit request.

29. The medium of claim 28, the one or more positions comprising at least one of the following:

at least one physical media item storage cell;

at least one media read/write drive; and a robotic media item transport device.

30. A data storage subsystem, comprising:

data storage facilities including:

a direct access storage device (DASD) cache; and a physical media library including a library manager; and a storage interface interconnected between a host and the data storage facilities, where the storage interface in communicating with the host emulates a virtual library including a plurality of virtual media items each containing a logical volume of data;

wherein the storage interface and library manager are programmed to perform a method for handling audit requests received from the host, the method comprising:

receiving from the host an audit request comprising a request to verify presence of a specified logical volume of the virtual library;

identifying physical locations of the logical volume, the physical locations comprising:

an address in the DASD cache, if the logical volume is stored in the DASD cache; and a physical volume corresponding to a physical media item in the physical media library, if the logical volume is stored in the physical media library; and if the identified physical locations include the DASD cache exclusively, providing an affirmative output to the audit request; and if the identified physical locations include the physical media library, searching the physical media library for the physical media item containing the physical volume that includes the specified logical volume, and providing an affirmative output to the audit request if the physical media item is found, otherwise, providing a negative output to the audit request.

31. The subsystem of claim 30, the cache comprising one or more magnetic disk drives.

32. The subsystem of claim 30, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

33. The subsystem of claim 30, further comprising the media items.

34. The subsystem of claim 33, the media items being magnetic data storage tapes.

35. The subsystem of claim 30, the searching of the physical media library for the physical media item containing the physical volume that includes the specified logical volume comprising:

cross-referencing the specified logical volume in a second list to identify one or more positions of the physical media item in the physical media library;

searching the identified positions for the physical media item; and providing an affirmative output to the audit request if the physical media item is found, otherwise, providing a negative output to the audit request.

36. The subsystem of claim 35, the one or more positions comprising at least one of the following:

at least one physical media item storage cell;

at least one media read/write drive; and a robotic media item transport device.

37. The subsystem of claim 30, the identification of physical locations of the specified logical volume comprising cross-referencing the specified logical volume in a first list indicating, for each one of a plurality of logical volumes, all corresponding physical locations containing underlying data represented by the logical volume.

38. The subsystem of claim 37, the first list including, for each logical volume:

an indication of whether the logical volume is contained in the cache; and an identification of a physical volume corresponding to a physical media item containing the logical volume, if the logical volume is stored in the physical media library.

39. The subsystem of claim 37, the first list indicating, for each one of a plurality of logical volumes, all corresponding physical locations containing underlying data represented by the logical volume.

40. The subsystem of claim 39, further comprising the host.

41. A data storage subsystem, comprising:

data storage facilities including:

a direct access storage device (DASD) cache; and a physical media library including a library manager; and a storage interface interconnected between a host and the data storage facilities, where the storage interface in communicating with the host emulates a virtual library including a plurality of virtual media items each containing a logical volume of data;

wherein the storage interface and library manager are programmed to perform a method for handling audit requests received from the host, the method comprising:

receiving from the host an audit request comprising a request to verify presence of a specified volume of the virtual library;

if the specified volume is a physical volume corresponding to a physical media item in the library, conducting a search of the physical media library for the physical media item and providing an affirmative output to the audit request if the physical media item is found, otherwise, providing a negative output to the audit request; and if the specified volume is a logical volume, performing steps comprising:
  identifying physical locations of the logical volume, the physical locations comprising at least one of the following:
    the DASD cache, if the logical volume is stored in the DASD cache; and
    a physical volume corresponding to a physical media item in the physical media library, if the logical volume is stored in the physical media library; and
  if the identified physical locations include the DASD cache exclusively, providing an affirmative output to the audit request; and
  if the identified physical locations include the physical media library, searching the physical media library for the physical media item containing the physical volume that includes the specified logical volume, and providing an affirmative output to the audit request if the physical media item is found, otherwise, providing a negative output to the audit request.

42. The subsystem of claim 41, wherein, if the underlying data is stored exclusively in the DASD cache, the method further comprises consulting a third list to identify a cache address for the logical volume and verifying presence of the logical volume at the identified cache address, the affirmative output to the audit request being provided only upon success of said verification.

43. The subsystem of claim 41, the identification of physical locations of the specified logical volume comprising cross-referencing the specified logical volume in a first list indicating, for each one of a plurality of logical volumes, all corresponding physical locations containing underlying data represented by the logical volume.

44. The subsystem of claim 43, the first list including, for each logical volume:
  an indication of whether the logical volume is contained in the cache; and
  identification of a physical volume corresponding to a physical media item containing the logical volume, if the logical volume is stored in the physical media library.

45. The subsystem of claim 41, the searching of the physical media library for the physical media item containing the physical volume that includes the specified logical volume comprising:
  cross-referencing the specified logical volume in a second list to identify one or more positions of the physical media item in the library;
  searching the identified positions for the physical media item; and
  providing an affirmative output to the audit request if the physical media item is found, otherwise, providing a negative output to the audit request.

46. The subsystem of claim 45, the one or more positions comprising at least one of the following:
  at least one physical media item storage cell;
  at least one media read/write drive; and
  a robotic media item transport device.

47. The subsystem of claim 41, the conducting of a search of the physical library for the physical media item comprising:
  cross-referencing the physical volume in a fourth list to identify one or more positions of the physical media item in the library;
  searching the identified positions for the physical media item; and
  providing an affirmative output to the audit request if the physical media item is found, otherwise, providing a negative output to the audit request.

48. The subsystem of claim 47, the one or more positions comprising at least one of the following:
  at least one physical media item storage cell;
  at least one media read/write drive; and
  a robotic media item transport device.

* * * * *